(No Model.)
J. R. FLETCHER.
POLE FOR ELECTRIC LINES, &c.
No. 451,730.  Patented May 5, 1891.
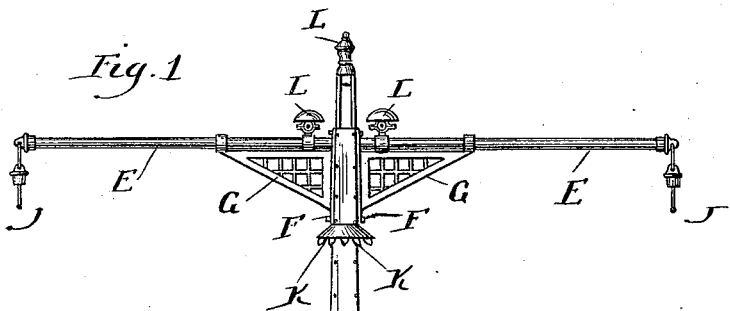
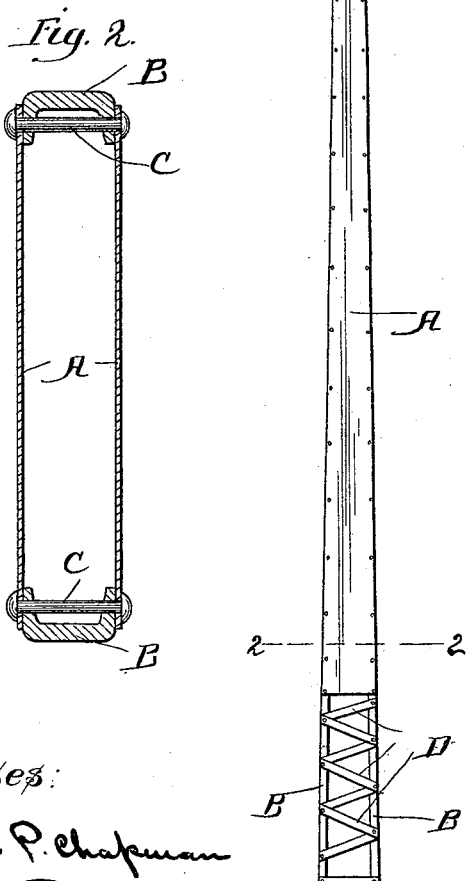
Witnesses:
Inventor:

UNITED STATES PATENT OFFICE.

JOHN R. FLETCHER, OF DAYTON, OHIO, ASSIGNOR TO THE ELECTRICAL SUPPLY COMPANY, OF CHICAGO, ILLINOIS.

POLE FOR ELECTRIC LINES, &c.

SPECIFICATION forming part of Letters Patent No. 451,730, dated May 5, 1891.

Application filed September 30, 1890. Serial No. 366,692. (No model.)

*To all whom it may concern:*

Be it known that I, JOHN R. FLETCHER, a citizen of the United States, residing at Dayton, in the county of Montgomery and State of Ohio, have invented a new and useful Improvement in Poles for Electric Lines and the Like, of which the following is a full, clear, and exact specification.

My invention relates to poles for supporting conductor-wires, and particularly poles for supporting conductor-wires used in overhead electric-railway systems, and is illustrated in the accompanying drawings, wherein—

Figure 1 is a side view of the pole. Fig. 2 is an enlarged horizontal cross-section of the line 2 2.

Like parts are indicated by the same letter in each of the figures.

A A are the side plates of which, in part, the pole is composed. They have upwardly-converging sides, as is seen in Fig. 1.

B B are the angle-bars, which form the other sides or edges of the poles.

C C are bolts which pass through the side plates and through the flanges of the angle-bars, and are preferably upset at both ends when in position, so as to make a permanently-rigid pole of uniform diameter in one direction, with a diminishing diameter in the opposite direction.

D D are the lattice-work slats, which form the continuation of the plates A below the surface.

E E are side arms projecting from the pole and secured by means of the bolts F F and the brackets G to its upper end. These poles may support, for example, the trolley-wires J J.

K K are lamps supported on the pole, if desired, and L L L may be insulator attachments for wires.

The use and operation of my invention are as follows: Up to the present time there has been considerable difficulty in the matter of the construction of electric-wire poles, for the reason that the poles should be light on the ground of economy. They should be ornamental, because they are placed in the public thoroughfares often in large cities. They should be capable of exerting great strength in opposition to side strains, as they are frequently used either with the arms here shown or to support the opposite end of tightly-drawn supporting-cables which cross the streets and from which the trolley-wires are suspended, They should be as small as possible, and in many cases it is desirable to have them hollow. The construction of the pole as here exhibited realizes to a considerable degree the several objects here sought to be attained. The pole is hollow, but with a comparatively narrow diameter in one direction, though this would be quite sufficient should it be desirable to pass the conductor-wires through the pole. The pole presents a narrow face or edge when seen from the sidewalk looking toward the street, and a gracefully-tapering side when viewed from the other direction or looking along the street. The comparatively wide side plates A, adapted so that the strains are distributed throughout the length of the plate, gives the pole great strength in the direction parallel to the plates, while the pole is comparatively light though strong enough with respect to strains which might come in the opposite direction. The pole so constructed also presents a smooth exterior, which is likewise necessary, and much to be preferred over poles made of angle-lines, where sharp edges are projected into the street and interfere with the traffic thereof.

Having thus described my invention, what I claim, and desire to secure by Letters Patent, is as follows:

1. A pole for supporting electric lines, consisting of comparatively wide upwardly-tapering side plates and narrow angle-bar edge plates, the whole bolted together so as to make a hollow pole, substantially as and for the purpose shown.

2. A pole for supporting electric lines, consisting of comparatively wide side plates and narrow angle-bar edge plates, the whole bolted together so as to make a hollow pole, substantially as and for the purpose shown.

JOHN R. FLETCHER.

Witnesses:
FRANCIS W. PARKER,
CELESTE P. CHAPMAN.